June 1, 1965 V. K. ELORANTA 3,186,324
PHOTOGRAPHIC APPARATUS
Filed Sept. 10, 1962 2 Sheets-Sheet 1

INVENTOR.
Veikko K. Eloranta
BY Brown and Mikulka
and
Robert E. Cork
ATTORNEYS

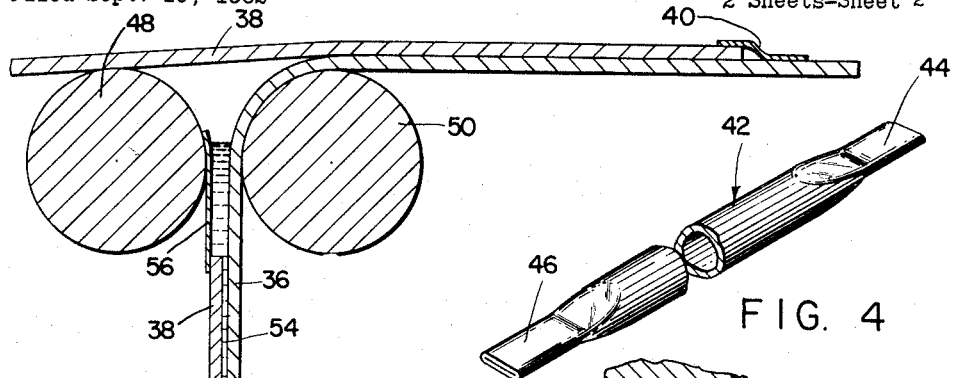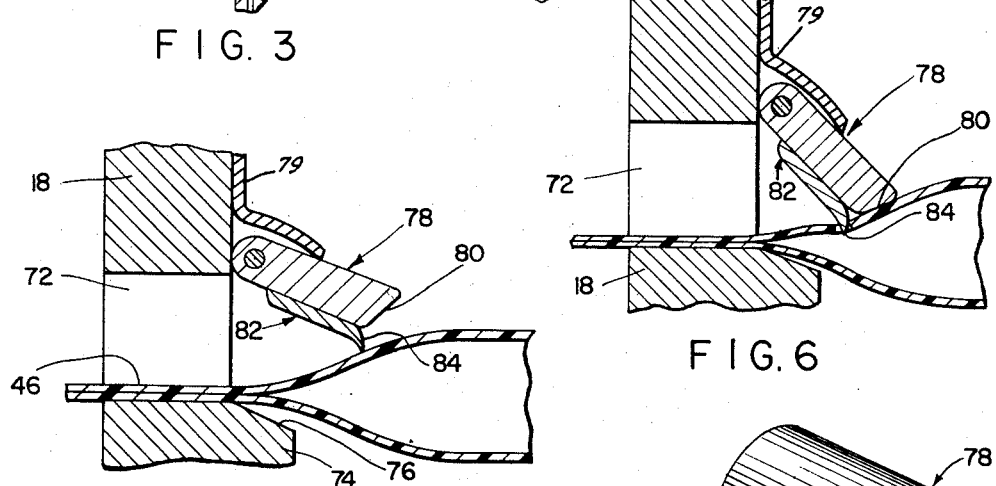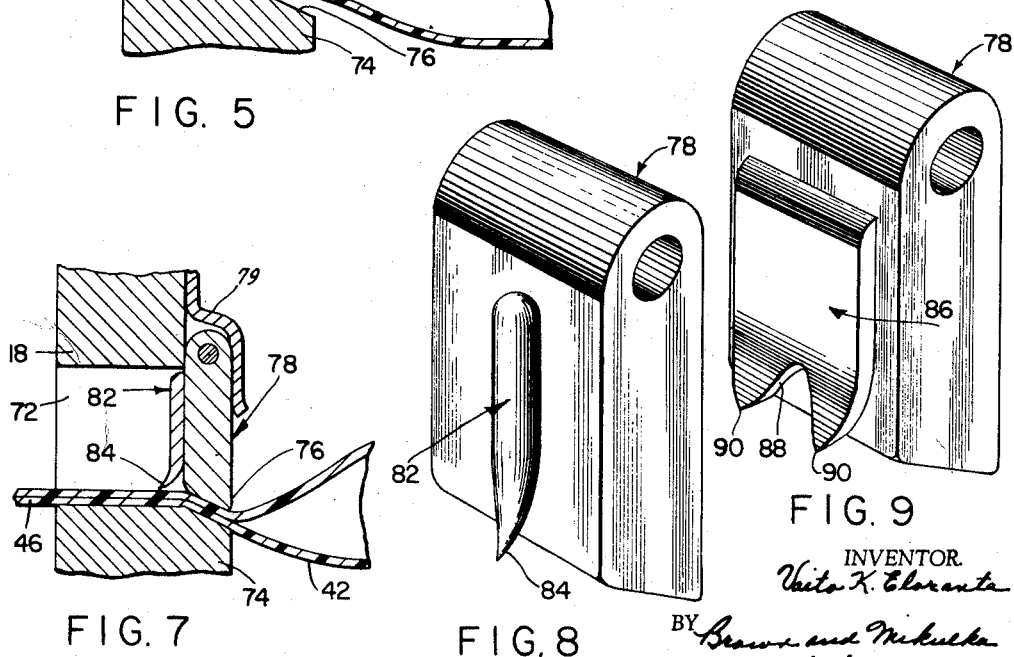

United States Patent Office 3,186,324
Patented June 1, 1965

3,186,324
PHOTOGRAPHIC APPARATUS
Vaito K. Eloranta, Needham, Mass., assignor to Polaroid Corporation, Cambridge, Mass., a corporation of Delaware
Filed Sept. 10, 1962, Ser. No. 222,591
11 Claims. (Cl. 95—89)

This invention relates to photographic apparatus and particularly to apparatus for treating photographic materials with a liquid.

In the copending U.S. application of Edwin H. Land, Serial No. 116,640, filed May 19, 1961, now Patent No. 3,155,024 issued November 3, 1964, there is disclosed photographic apparatus in the form of a camera for exposing an area of photosensitive image-recording sheet and thereafter treating the exposed area with a liquid distributed between the image-recording sheet and another sheet superposed therewith. The processing liquid is supplied in an elongated tubular container similar to a drinking straw, and the apparatus includes means permitting the container to be introduced lengthwise into the apparatus into a position extending across one of the sheets, and for compressing the container as it is being withdrawn in order to dispense the fluid contents of the container onto the sheet in the form of an elongated mass extending across the sheet. The camera accordingly includes at least one opening through which the container can be introduced and withdrawn, means for closing the opening against the admission of light and means for compressing the container during its withdrawal.

The present invention has as an object the provision, in apparatus of the character described, of novel and improved means for closing the opening into the apparatus and compressing the container to discharge its fluid contents during withdrawal through the opening.

Another object of the invention is to provide means for compressing the container designed to puncture the container so as to allow the admission of air into the container to replace the fluid contents of the container as the latter are discharged.

Other objects of the invention will in part be obvious and will in part appear hereinafter.

The invention accordingly comprises the apparatus possessing the construction, combination of elements and arrangement of parts, which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 3 is an enlarged sectional view illustrating operation of the camera and the construction of photographic materials useful therein;

FIG. 4 is a fragmentary perspective view of a container useful in the camera;

FIGS. 5, 6 and 7 are enlarged sectional views illustrating the operation of the invention; and FIGS. 8 and 9 are perspective views showing two embodiments of a component of the camera.

Figure 1:
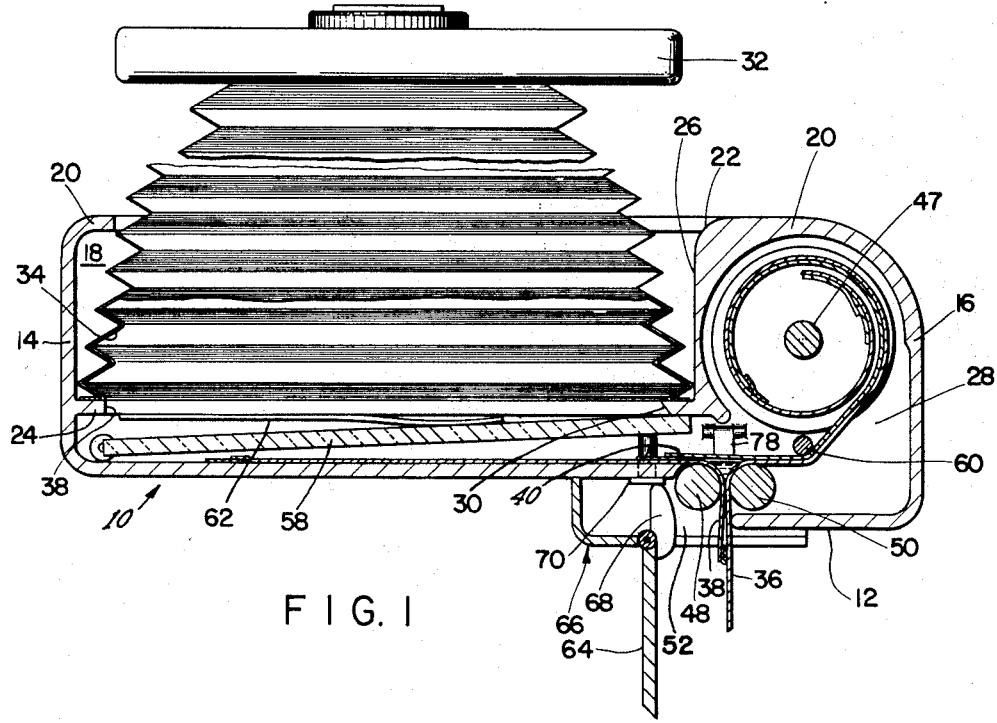
FIGURE 1 is a sectional view taken midway between the sides of photographic apparatus in the form of a camera embodying the invention.
Figure 2:
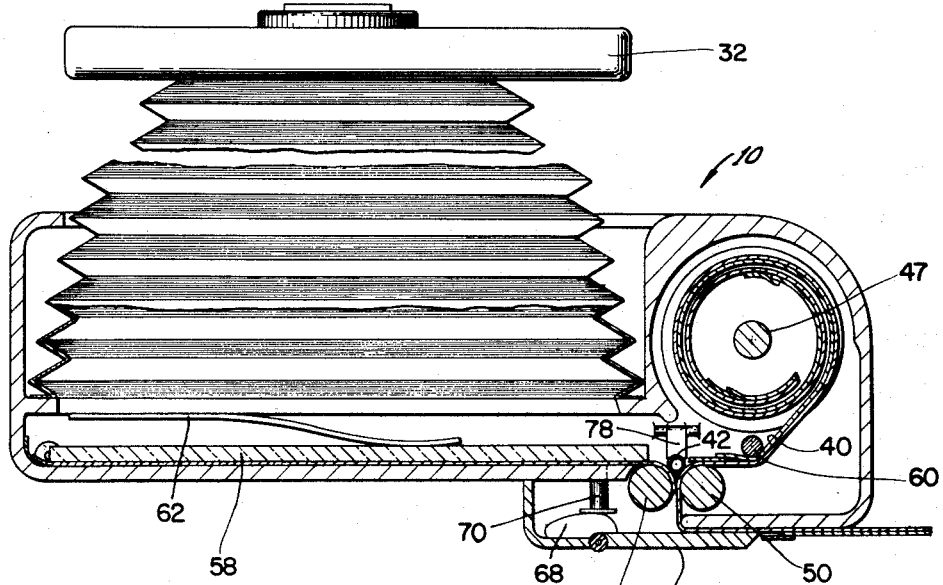
FIG. 2 is a view similar to FIGURE 1 illustrating another operative position of the camera.

Reference is now made to FIGS. 1 and 2 of the drawings wherein there is illustrated photographic apparatus in the form of a hand-held camera embodying the invention. The camera, designated 10, comprises a housing including a rear wall 12, end walls 14 and 16, side walls 18 and a forward wall 20 having an opening 22. The housing also includes an inner forward wall 24 joined at three sides to side walls 18 and end wall 14, and at one side to an intermediate end wall 26 which is joined to inner forward wall 24, side walls 18 and forward wall 20 at one side of opening 22. Intermediate end wall 26 cooperates with end wall 16, forward wall 20 and side walls 18 to define a storage chamber 28 at one end of the camera housing. Inner forward wall 24 is located adjacent and substantially parallel with rear wall 12 and cooperates with the rear wall to define an exposure chamber. Inner forward wall 24 is provided with an aperture 30 for admitting light to the exposure chamber.

The camera includes a conventional lens and shutter assembly designated 32 coupled with the camera by a folding bellows 34 joined to the shutter assembly and to inner forward wall 24 in the periphery of aperture 30. A suitable erecting system (not shown) is provided for supporting the lens and shutter assembly in the operative position shown while permitting assembly 32 to be retracted into the housing within opening 22 in forward wall 20.

Camera 10 is designed to expose and process a succession of areas of photosensitive sheet material to produce a succession of positive photographic prints. In order to achieve a construction which is small, compact and inexpensive yet capable of producing relatively large prints, it is advantageous to employ photographic sheet material in roll form particularly in the form of a single roll or coil; to expose the photosensitive sheet to its edges in order to conserve both space and photosensitive materials; and to supply and distribute the processing liquid in such a way as to simplify the means required to perform these operations. Exposing the photosensitive material to its edges, e.g., two lateral and one transverse, presents a number of problems relating to the design and construction of both the sheet materials and the means in the camera for manipulating the sheet materials particularly when it is a prerequisite that the construction of the expendable materials also be simple and hence inexpensive.

Reference is now made to FIGS. 1 through 3 of the drawings in which there is illustrated a photographic film assemblage characterized by a construction which is simple and inexpensive while providing for the production of a plurality of relatively large photographic prints in apparatus which meets the criteria discussed. The film assemblage comprises an elongated carrier sheet 36 at least equal in width to the width of the photographic images to be produced in and by the apparatus, and is formed of a flexible sheet material, such as paper, which is or may be rendered opaque to actinic light. The film assemblage is provided in a roll form and includes a plurality of individual photosensitive image-recording sheets 38 each generally rectangular in shape and attached to carrier sheet 36. Each of the image-recording sheets 38 includes a layer of a photosensitive image-recording material such as a silver halide emulsion, carried on a supporting sheet of conventional film base material such as paper which is opaque to light actinic to the photosensitive material. The image-recording sheets are each substantially equal in width to the width of the photographic image to be produced thereon and are secured in succession to carrier sheet 36 with the rear surface of each image-recording sheet, i.e., the surface opposite the photosensitive layer, located in face-to-face contact with the second sheet. Each of the image-recording sheets is secured to the carrier sheet at one edge, termed its trailing edge, by means such as a hinge 40 which permits the image-recording sheet to be pivoted about its trailing edge with respect to the carrier sheet through 180° so that the photosensitive layer of the image-recording sheet faces the carrier sheet. The sheets are initially provided in a coiled condition on a spool with the image-recording sheets coiled innermost and with the hinged trailing ends of the image-recording sheets disposed toward the trailing end of the carrier sheet so that the free leading edges of the image-recording sheets are withdrawn from the coil first.

The camera shown is designed to expose an area of each image-recording sheet extending to the lateral edges thereof and thereby take the fullest possible advantage of the available photosensitive material. The camera is also preferably designed to expose the image-recording sheet to the leading edge thereof and to hinge 40 which is made as small as possible in order to achieve the fullest possible utilization of the photosensitive material. The film construction shown and the particular novel construction of the camera make it possible to manipulate the individual photosensitive sheets in such a way as to expose the photosensitive sheets to at least three edges and then to process the exposed photosensitive sheets, all of which is accomplished in a camera characterized by a small, compact and relatively simple construction.

Processing of each exposed photosensitive sheet, preferably to produce a positive transfer print on the carrier sheet by a silver halide diffusion-transfer reversal process, is accomplished by superposing the photosensitive layer of each image-recording sheet with a surface of carrier sheet 36 and distributing a viscous processing liquid between the two sheets by advancing the sheets between a pair of juxtaposed pressure-applying members. The processing liquid, in the form shown, is provided initially in an elongated tubular container, designated 42 in FIG. 4. Container 42 is shaped very much like a conventional drinking straw, has a rounded cross section which is substantially uniform throughout the length of the container and is formed of a material which is air and water impervious and inert to the processing liquid; organic plastics, metal foils and multi-ply materials including plastic, paper and metal foils being suitable for this purpose. The container is sealed at one end, termed trailing end 44, in such a way as to become unsealed in response to hydraulic pressure generated within the liquid contents of the container to thereby provide a mouth substantially equal in area to the cross sectional area of the fluid-filled portion of the container, and the liquid contents of the container are discharged through this mouth. The leading end, designated 46, of the container is sealed in a similar manner by flattening the container, and a flattened portion is provided of sufficient length to permit it to be grasped manually.

The liquid contents of the container are dispensed therefrom onto one of the sheets in the form of an elongated uniformly distributed mass extending from side to side of the area of the sheet to be treated with the liquid. This is accomplished by introducing container 42 into the apparatus so that it is positioned closely adjacent one or both of the sheets at an edge of an area thereof to be treated, with the fluid-filled portion of the container extending substantially from side to side of this area. The container is then withdrawn in the direction of its elongation toward leading end 46 while the container is being compressed progressively from its leading end toward its trailing end to open the trailing end of the container and eject the fluid contents thereof onto one or both of the sheets. The dispensation of the processing liquid from the container onto the sheets is thus accompanied by ridding the sheets of the container so that the apparatus which subsequently distributes the processing liquid in a layer between the two sheets is not required to accommodate the thickness of the container.

The film assemblage, comprising carrier sheet 36 and a plurality of image-recording sheets 38, is preferably coiled on a spool 47 the ends of which function to prevent exposure of the individual image-recording sheets as the film assembly is loaded into storage chamber 28 of the camera, the latter being constructed to provide access for loading. The means for distributing the processing liquid between the sheets comprises a pair of juxtaposed pressure-applying members shown in the form of cylindrical rolls 48 and 50 mounted in the rear of chamber 28 in alignment with an opening 52 therein through which the image-recording and carrier sheets may be withdrawn. Roll 48 is mounted for rotation in a fixed position, and roll 50 may be mounted for movement toward and away from roll 48 and is urged toward roll 48 by a siutable spring (not shown) which may be housed in the rear of chamber 28. The means for mounting roll 50, also housed within chamber 28, preferably provides for spacing the rolls a fixed minimum distance apart, this distance being approximately equal to the combined thicknesses of carrier sheet 36, image-recording sheet 38 and the layer 54 of liquid to be distributed therebetween by withdrawing the sheets between rolls 48 and 50 from the camera through opening 52. In order to insure the spreading of the liquid to the lateral edges of the sheets, the liquid supplied for processing each image-recording sheet is generally in excess of the amount required so that provision is made for collecting and retaining this excess liquid and preventing it from coming into contact with roll 48. In the form shown, these means comprise a trapping sheet 56 of a material which is substantially thinner than the material comprising photosensitive sheet 38 attached to the leading end of each photosensitive sheet. Since the minimum gap between rolls 48 and 50 is approximately equal to the combined thickness of carrier sheet 36, image-recording sheet 38 and layer 54, as trapping sheet 56 passes between rolls 48 and 50, a space is provided between the trapping sheet and the carrier sheet in which any excess processing liquid collects and is retained.

The apparatus includes means for holding each successive image-recording sheet against the forward surface of rear wall 12 in position for exposure substantially at the focal surface of the lens of assembly 32. These means must also permit exposure of the image-recording sheet to its lateral edges and substantially to its end (transverse) edges and, in the form shown, comprise a clamping plate 58 having substantially parallel surfaces at least coextensive with the area of the image-recording sheet to be exposed and formed of a transparent material such as glass or organic plastics. Clamping plate 58 is positioned between rear wall 12 and intermediate wall 26 and is mounted for pivotal movement toward and away from rear wall 12 between an inoperative position shown in FIGURE 1 and an operative position shown in FIG. 2. Plate 58 and rear wall 12 in the inoperative position cooperate to form a convergent passage into which each image-recording sheet is introduced and within which each image-recording sheet is thereafter clamped in position for exposure.

In the operation of the apparatus, carrier sheet 36 extends from the coil on spool 47 within chamber 28 between rolls 48 and 50 from the camera. Withdrawal of the carrier sheet causes the leading end of a leading edge of an image-recording sheet, attached to the carrier sheet, to advance into the convergent passage provided between rear wall 12 and clamping plate 58. To insure movement of the leading edge of the carrier sheet in the correct direction between plate 58 and rear wall 12, a guide member 60 is provided within chamber 28 adjacent roll 50. The withdrawal movement of the carrier sheet is continued until the image-recording sheet is in position for exposure whereupon movement of the carrier sheet and image-recording sheet is discontinued. Hinges 40, in the construction shown, function to indicate to the operator that an image-recording sheet is in position for exposure so that the operator may discontinue withdrawal movement of the carrier sheet. This indication is an abrupt increase in the force required to withdraw the carrier sheet between the pressure rolls due to the added thickness of the hinge which is folded upon itself as it enters the bite of the rolls. Clamping plate 58 is then allowed to pivot rearwardly under the bias of springs 62 mounted on inner forward wall 24 and disposed in engagement with the lateral edges of the clamping plate, to the operative position in which the image-recording sheet is clamped between plate 58 and rear wall 12. Following exposure of the image-recording sheet, a quantity of processing liquid is dispensed between the image-recording and the carrier sheet where the two sheets are joined at the bite of rolls 48 and 50. The carrier sheet, hinge, and photosensitive sheet are then withdrawn between the rolls simultaneously distributing the processing liquid between the exposed image-recording sheet and carrier sheet while advancing the next succeeding image-recording sheet into exposure position between plate 58 and rear wall 12. The exposed image-recording sheet is superposed and processed in conjunction with an area of the carrier sheet which is superposed with the next succeeding image-recording sheet. Withdrawal of the carrier sheet is continued until the next succeeding image-recording sheet is in position for exposure and the hinge thereof has entered the bite of the rolls.

The camera includes means for severing the carrier sheet at the trailing edge of each trapping sheet 56 so that the exposed photosensitive sheet may be separated from the carrier sheet containing a transfer print when processing and print formation have been completed. These means comprise a cutter bar 64 in the form of a flat plate pivotally mounted adjacent one edge within an auxiliary housing 66 provided on rear wall 12 and cooperating with the rear wall to provide opening 52. Cutter bar 64 is pivotable between the open position shown in FIGURE 1 in which opening 52 is unobstructed and the closed position shown in FIG. 2 in which the cutter bar extends across opening 52 in closing relation thereto and in juxtaposition with a portion of rear wall 12 adjacent opening 52. In the closed position of the cutter bar, a portion of carrier sheet 36 is clamped between the cutter bar and rear wall 12; and the former is provided with a sharpened edge against which the carrier sheet may be drawn to sever the carrier sheet. The portion of the carrier sheet clamped between rear wall 12 and the cutter bar thereafter functions as a leader by which the carrier sheet may be grasped to withdraw the next succeeding image-recording sheet between pressure-applying rolls 48 and 50 when the cutter bar is moved to its open position.

Since the cutter bar must be opened in order to grasp and withdraw the carrier sheet, and clamping plate 58 must be pivoted to its inoperative position to permit an exposed image-recording sheet to be withdrawn while the next succeeding image-recording sheet is advanced into position for exposure, the cutter bar is coupled with the clamping plate so that operation of the cutter bar also operates the clamping plate. The coupling means shown comprise a pair of cams 68 mounted on the cutter bar and pivotable therewith, and cam follower pins 70 extending from the outside of rear wall 12 within auxiliary housing 66 through the rear wall into engagement with lateral portions of clamping plate 58. Cams 68 are designed to move pins 70 inwardly when the cutter bar is moved to open position and to allow the outward movement of the pins when the cutter bar is pivoted into its closed position. By virtue of this construction, the clamping plate is, of necessity, moved into proper position at the proper time; and this is accomplished by the necessary movement of the cutter bar.

The camera includes means permitting the introduction of container 42 into the camera so that the container is located adjacent hinge 49 and the image-recording and carrier sheets at the bite of rolls 48 and 50 and for compressing the container as the latter is withdrawn from the camera transversely of the sheets. In the form shown in detail in FIGS. 5 through 8, these means comprise a circular opening 72 in one of side walls 18 designed to receive container 42. Opening 72 is so located that a container 42, introduced through the opening, will be disposed closely adjacent the sheets at the bite of the rolls while little or no light is allowed to enter the housing around the container. Mounted on wall 18 to the rear of opening 72 is a backing member 74 having a support surface 76 facing the wall of the camera and inclined inwardly and rearwardly to a position displaced rearwardly from the opening by a distance at least equal to the thickness of the flattened container. A compression member 78 is provided mounted for pivotal movement inwardly and forwardly from a closed position shown in FIG. 7 in which the compression member extends rearwardly across and in closing relation to opening 72 to an open position shown in FIG. 5. Compression member 78 is urged into its closed position by a spring 79 mounted on wall 18 and having sufficient strength to retain the compression member in closed position while permitting the compression member to be pivoted to its open position in response to the introduction of a container into the opening. Compression member 78 includes an end section having an end surface 80 which, in the closed position of the compression member, is located substantially parallel with support surface 76 and is spaced therefrom by a distance approximately equal to thickness of the flattened container. By virtue of this construction, the container is movable in a flattened condition between the end surface of the compression member and the support surface of the backing member with the compression member in its closed position, yet light is prevented from entering the camera housing through opening 72 and between the compression member and the backing member when the compression member is in its closed position. Inclining support surface 76 and end surface 80 rearwardly and inwardly serves another function during withdrawal of the container between the compression member and the backing member. This is to urge the container rearwardly into contact with the sheets at the bite of the rolls so that contact between the liquid as it is discharged from the trailing end of the container is assured since the trailing end of the container will contact the sheets during withdrawal movement.

Since the container is formed of a material which is both air and water impervious and tends to return to its original cross sectional configuration following flattening of the container, there is a tendency for some liquid to remain in the container as the container is compressed progressively to eject its fluid contents. It has been discovered that a more complete ejection of the fluid contents of the container with far greater ease is possible if the container is punctured adjacent the leading end of the fluid-filled cavity in order to admit air into the container and facilitate the collapse of the container and the complete discharge of its contents due to application of compressive pressure by compression member 78. Means are provided on the compression member for puncturing the container during the initial portion of the withdrawal movement of the container; and, in the form shown in FIG. 8, these means comprise a puncturing element or pin 82 mounted on the outer surface of compression member 78 and having an end section 84 tapering to a point, and in the closed position of compression member 78, extending outwardly and toward support surface 76 of backing member 74. End section 84 terminates at a point spaced from support surface 76 and the adjacent surface of the wall of opening 72 by a distance slightly greater than the thickness of the flattened container so that puncturing element 82 will not interfere with the withdrawal movement of the flattened container through opening 72 when compression member 78 is in closed position. In the open position of compression member 78 shown in FIG. 5, puncturing element 82 rests on the leading end portion of the fluid-filled cavity of the container at a position intermediate the flattened leading end of the container and the fully extended portion of the fluid-filled cavity with the tapered end section 84 of element 82 projecting rearwardly toward the container wall. Then as withdrawal movement of the container is initiated as shown in FIG. 6, puncturing element 82 is engaged by the container pivoting compression member 78 into closed position while the puncturing element perforates the wall of the container forming an opening therein through which air may be admitted to facilitate complete ejection of the fluid contents of the container.

Another embodiment of the compression member and puncturing element is illustrated in FIG. 9 of the drawings. The compression member designated 78 remains substantially as described, and the puncturing element designated 86 is formed of a substantially rigid hard sheet material such as metal, secured to the outer surface of compression member 78 and having a free-end section extending in a closed position of the compression member outwardly and rearwardly toward support member 74. This end section of puncturing element 82 is tapered and formed with a V-shaped notch 88 defining a pair of end sections 90 each tapering to a sharpened point capable of functioning in the same manner as end section 84 of puncturing element 82 to perforate the container. The apex of notch 88 is located substantially midway between the opposite sides of opening 72, and the pointed ends of end sections 90 are substantially equally spaced from the center of the opening. By virtue of this construction, puncturing element 86 and particularly V-shaped notch 88 functions to guide container 42 into proper position with respect to the sheets and the bite of the rolls during introductory movement of the container since the puncturing element is located inwardly from opening 72 with end sections 90 bearing against opposite sides of the rounded container during its introductory movement. This arrangement has the added advantage of obviating any tendency of the puncturing member to cause the container to bend or deflect toward either end of the camera during the initial portion of withdrawal movement of the container.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In photographic apparatus including a housing formed with an opening for admitting a tubular container, having a liquid-filled portion, into said housing, in combination:

means for compressing said container during withdrawal movement thereof from said housing through said opening, said means including a member mounted adjacent one side of said opening for movement between an inoperative position in which said container is free to move inwardly through said opening without being compressed and an operative position in which said member compresses said liquid-filled portion of said container, said member being movable into said operative position during and in response to the initial withdrawal movement of said container; and means for puncturing said container at the leading end of said liquid-filled portion during the initial withdrawal movement thereof from said housing through said opening, said means for puncturing said container being mounted on said member for movement into engagement with said container as said member is moved from said inoperative to said operative position during and in response to engagement with said container during said initial withdrawal movement thereof.

2. In photographic apparatus including a housing formed with an opening for admitting a tubular container, having a liquid-filled portion, into said housing, in combination:

means for compressing said container during withdrawal movement thereof from said housing through said opening, said means comprising a compression member movable from an inoperative position to an operative position in which said member compresses said liquid-filled portion of said container in response to withdrawal movement of said container; and means for puncturing said container at the leading end of said liquid-filled portion during the initial withdrawal movement thereof from said housing through said opening, said means for puncturing said container comprising a pointed member mounted on said compression member and movable therewith from said inoperative to said operative position to puncture said container.

3. In photographic apparatus including a housing formed with an opening for admitting a tubular container of liquid into said housing, in combination:

a fixed backing member mounted within said housing adjacent one side of said opening;

a compression member mounted within said housing adjacent the opposite side of said opening;

said compression member having a closed position in which said compression member extends across said opening into juxtaposition with said backing member, and being mounted for pivotal movement inwardly in response to introductory movement of said container;

means for urging said compression member into said closed position; and a puncturing member mounted on the outside of said compression member for perforating said container during withdrawal thereof;

said puncturing member including an end section extending, in the closed position of said compression member, toward said backing member and tapering to a point spaced outwardly from said backing member.

4. The photographic apparatus of claim 3 in which said puncturing member includes a pair of end sections tapering to points disposed, in the closed position of said compression member, substantially equidistant from the center of said opening.

5. The photographic apparatus of claim 3 in which said compression member, in the closed position thereof, covers said opening, and said compression member includes a sheet engagement surface at its end closest said backing member inclined inwardly and toward said backing member and the latter includes a sheet engagement surface disposed facing and in generally parallel relation with said engagement surface of said compression member.

6. In photographic apparatus for treating a photographic sheet with a liquid and including a housing having an opening through which an elongated tubular container of said liquid can be introduced, the combination with said apparatus of means for closing said opening while permitting the introduction of said container through said opening and dispensing the liquid contents of said container upon said sheet during withdrawal of said container from said apparatus through said opening, said means comprising:

a movable member mounted within said housing adjacent one side of said opening;

said member having a closed position in which said member extends across said opening in closing relation thereto and being pivotable inwardly to an open position in which said member is located adjacent and to one side of the path of introductory movement of said container through said opening;

means for urging said movable member into said closed position;

a fixed backing member located within said housing adjacent said opening on the opposite side thereof from said movable member;

said movable member including an end section having a container engagement surface juxtaposed with and spaced from said backing member, in said closed position of said movable member, by a distance approximately equal to the thickness of said container when collapsed; and means for puncturing said container adjacent said movable member as withdrawal movement of said container is initiated;

the last-mentioned means comprising an element having an end section tapered to a point and mounted on the outer side of said end section of said movable member so as to extend, in the closed position of said movable member, toward said backing member and terminate at a point located at least as remote from said backing member as said engagement surface.

7. The photographic apparatus of claim 6 in which said housing includes a wall, said opening is formed in said wall, said movable member is mounted on the inside of said wall adjacent said opening, and said backing member is mounted on the inside of said wall adjacent the opposite side of said opening.

8. The photographic apparatus of claim 6 in which said movable member is mounted for pivotal movement between said open and closed positions and is urged by resilient means into said closed position.

9. The photographic apparatus of claim 6 in which said tapered end section of said element is curved so as to extend, in the closed position of said movable member, in the direction of withdrawal movement of said container.

10. The photographic apparatus of claim 6 in which said element includes two of said end sections tapering to points spaced from one another and disposed substantially equidistant from opposite sides of said opening for guiding said container into said apparatus during introductory movement through said opening.

11. The photographic apparatus of claim 6 in which said engagement surface is inclined inwardly and toward said backing member and the latter includes a sheet engagement surface facing said engagement surface and disposed in generally parallel relation therewith.

References Cited by the Examiner

UNITED STATES PATENTS

| 2,789,488 | 4/57 | Eloranta | 95—13 |
| 2,834,272 | 5/58 | Erlichman | 95—13 X |
| 2,921,718 | 1/60 | Meissner | 222—103 |

FOREIGN PATENTS 506,861  12/54  Italy.

NORTON ANSHER, *Primary Examiner.*

EMIL G. ANDERSON, *Examiner.*